United States Patent [19]

Bräuning

[11] 3,893,134
[45] July 1, 1975

[54] EXPOSURE CONTROL APPARATUS
[75] Inventor: Gerhard Bräuning, Ruit, Germany
[73] Assignee: Eastman Kodak Company, Rochester, N.Y.
[22] Filed: Nov. 7, 1973
[21] Appl. No.: 413,751

[30] Foreign Application Priority Data
Nov. 11, 1972 Germany.............................. 2255329

[52] U.S. Cl. .................. 354/30; 354/228; 354/247
[51] Int. Cl. ........................................... G03b 7/08
[58] Field of Search ............ 354/26, 29, 30, 36, 38, 354/48, 49, 59, 226, 228, 231, 234, 235, 245, 247, 259, 44

[56] References Cited
UNITED STATES PATENTS
| | | | |
|---|---|---|---|
| 3,362,309 | 1/1968 | Cooper, Jr. et al................... | 354/39 |
| 3,433,138 | 3/1969 | Burgarella......................... | 354/38 X |
| 3,620,143 | 11/1971 | Burgarella............................. | 354/49 |
| 3,672,267 | 6/1972 | Harvey et al. ....................... | 354/29 |
| 3,714,871 | 2/1973 | Bresson............................. | 354/44 X |
| 3,721,167 | 3/1973 | Ogiso............................... | 354/38 X |

FOREIGN PATENTS OR APPLICATIONS
18,175  8/1965  Japan.................................... 354/26

Primary Examiner—Joseph F. Peters, Jr.
Attorney, Agent, or Firm—J. L. Palmer

[57] ABSTRACT

Exposure control apparatus includes diaphragm blades mounted for movement to form an exposure aperture between a minimum and maximum size, and a control member movable to control the rate of the opening movement of the diaphragm blades. Light responsive apparatus senses the level of received light intensity and arrests the movement of the diaphragm blades, in a range below the maximum exposure aperture size, to establish the exposure aperture at a size which is related to received light intensity. The control member, at a preselected position in its movement, releases a shutter blade to move to open the exposure aperture. A shutter closing member is releasable in response to setting of the exposure aperture to release the shutter blade to close the exposure aperture after a time related to the time required to establish the exposure aperture.

5 Claims, 3 Drawing Figures

EXPOSURE CONTROL APPARATUS

BACKGROUND OF THE INVENTION

1. Field of the Invention

The present invention relates to exposure control apparatus which establishes an exposure in relation to received light intensity. More particularly, the invention relates to the establishment of an exposure aperture of size related to received light intensity and for the initiation and termination of an exposure in relation to the time required to form the exposure aperture.

2. Description of the Prior Art

In cameras which are operable to produce an exposure related to light intensity conditions it is desirable to provide exposure control apparatus which is simple and economical and which will produce an exposure over a wide range of light intensity conditions. In an effort to achieve such a device, a diaphragm shutter, which opens an exposure aperture slowly until exposure has been completed and in response to a sensed light level rapidly closes the aperture, has been extensively used. These devices, in addition to such operation, have also provided some program flexibility, i.e., means for varying the relationship between the number of "stops" of shutter speed to the number of stops of aperture as the device opens, so that various combinations of depth of field and motion stopping ability can be achieved. Thus these devices are simple and economical and operate over a full range of light intensity conditions with some degree of flexibility. However, these devices, because they slowly open the exposure aperture, are inefficient in operation, and seldom achieve more than 50 percent efficiency except for extended exposure times.

In an effort to provide exposure control apparatus which overcomes the low operating efficiency of the diaphragm shutter, but which retains the flexibility and the desired range of operation over all light intensity conditions, cameras have been equipped with a variable, light level responsive diaphragm and opening and closing shutter blades with additional electronic circuitry which "integrates" light to control shutter speed. In these devices the lack of efficiency of the diaphragm shutter has been overcome while maintaining range and program flexibility, but at the expense of simplicity and economy.

In the present invention, a device is provided which has many of the previously enumerated characteristics of the diaphragm shutter i.e., simplicity, economy, flexibility and range but which also approaches the efficiency achieved by the more expensive apparatus described in the paragraph above.

SUMMARY OF THE INVENTION

It is therefore an object of the present invention to provide improved exposure control apparatus which establishes an exposure aperture and regulates the closing of the exposure aperture to terminate an exposure in relation to sensing a level of received light intensity.

It is another object of the present invention to provide a simple and economical shutter apparatus which operates efficiently over a full range with program flexibility.

It is also an object of the present invention to provide improved exposure control apparatus which includes cooperating diaphragm adjusting apparatus and a single shutter blade to provide efficiently operating exposure control apparatus.

It is a further object of the present invention to provide improved exposure control apparatus which uniquely combines electronic and mechanical apparatus responsive to received light level to accomplish both aperture adjustment and shutter timing while providing a fast shutter speed and an efficiently operating mechanism.

It is another object of the present invention to provide improved exposure control apparatus which establishes an exposure aperture in relation to received light intensity and also controls exposure time in relation to received light level intensity while advantageously utilizing a single electromagnet in both exposure aperture control and shutter speed control.

It is still another object of the present invention to provide improved means for providing a shutter speed related to light intensity and also for limiting the shutter speed to a preset maximum value.

In accordance with the invention, these and other objects and advantages are attained by one embodiment in which exposure control apparatus comprises diaphragm means which are mounted for movement to form an exposure aperture between a minimum and maximum size and shutter means mounted for movement for opening and closing the exposure aperture thus formed. Light responsive means are provided for sensing the level of received light intensity and for coupling the diaphragm means and the shutter means, the light responsive means being movable for controlling the setting of the diaphragm means to an exposure aperture size which is related to received light intensity and for controlling the closing of the shutter means in relation to the time required to form the exposure aperture. Apparatus is thus attained which controls the relationship between time, the setting of the diaphragm means and the closure of the shutter means in relation to sensing a level of received light intensity.

In a preferred embodiment of the invention, the apparatus releases the shutter means to open at a preset time after actuation of the apparatus and is responsive to received light intensity level 1) regulate the opening movement of diaphragm means, 2) set the diaphragm means at a light related aperture size and 3) release a shutter closing element which may begin the shutter closing operation before the shutter means have opened.

In an additional feature of the invention the light responsive means includes a single electromagnet to set a diaphragm aperture size and to actuate a shutter closing member, thus controlling both the aperture setting and shutter closing functions through a single operation of an electromagnet in response to the level of received light sensed.

BRIEF DESCRIPTION OF THE DRAWINGS

Other objects and advantages of the invention will become apparent upon reading of the following detailed description and upon reference of the drawings, in which.

DETAILED DESCRIPTION OF THE DRAWINGS

Because photographic cameras are well known, the present description will be directed in particular to elements forming part of, or cooperating more directly with the present invention, camera elements not particularly shown or described herein being understood to be selectable from those known in the art.

Figures 1, 2:
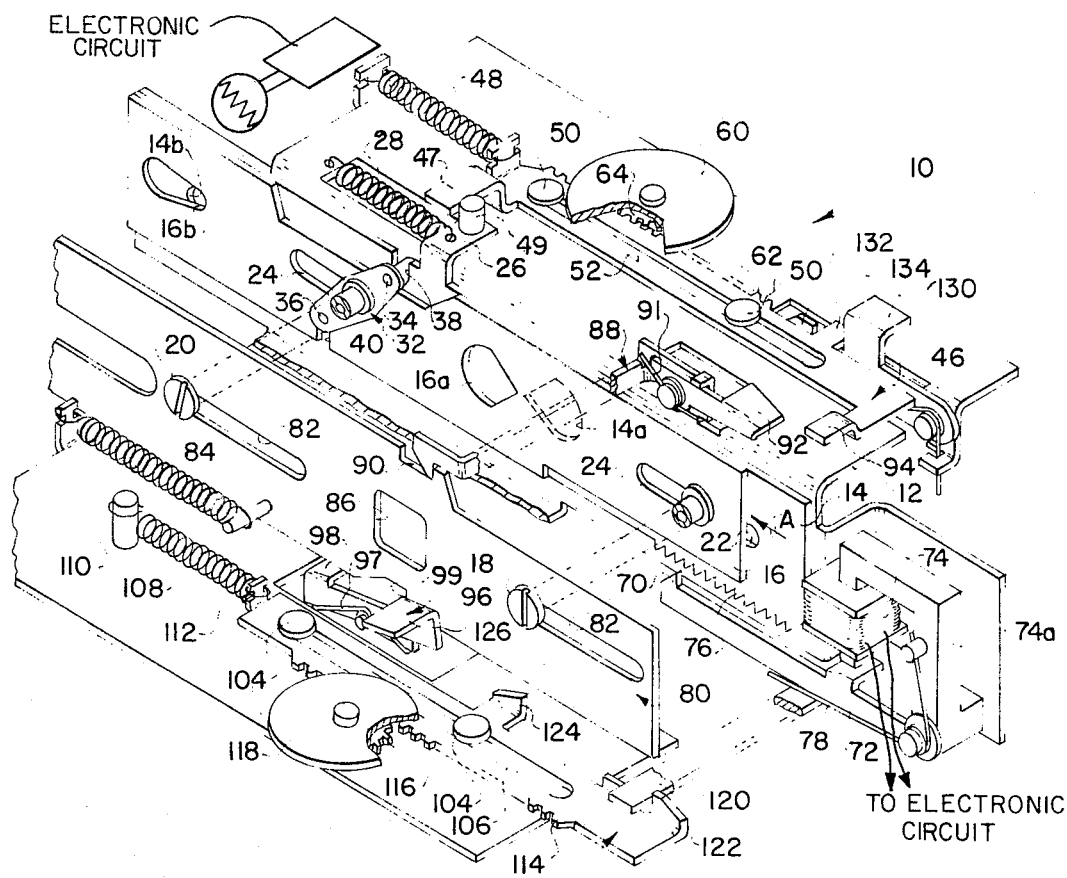
FIG. 1 is an exploded perspective view of exposure control apparatus according to the invention, shown in a cocked position.
FIG. 2 is an exploded perspective view of apparatus of FIG. 1 in which a diaphragm has been adjusted to a size related to light intensity and a shutter has moved to an open position.

Referring first to FIG. 1 there is shown exposure control apparatus 10, mounted upon an angle-shaped support plate 12. The support plate 12 includes a lateral top, a lateral bottom, and a vertical portion therebetween upon which a pair of diaphragm blades 14 and 16 are mounted. The diaphragm blades 14, 16 are mounted so as to be slidable along the vertical portion by means of screws 18 and 20 received in slots 22 and 24 of the blades 14 and 16 respectively. The diaphragm blade 14 is urged in the direction of arrow A by a tension spring 28 which is attached to a flange 26 of the blade 14 and is also attached to the lateral top section of the support plate 12. The blade 14 is coupled to the blade 16 by a transmission lever 32 which is also mounted to the vertical portion of the support plate 12 by the screw 20. Pins 34, 36, carried by the transmission lever 32, are movable in slots 38, 40 of the blades 14 and 16 respectively so that upon movement of the blade 14 in the direction of arrow A, the transmission lever 32 will pivot about the screw 20 to move the blade 16 concurrently with the blade 14, but in an opposed direction. Apertures 14a, 14b and 16a, 16b of the blades 14, 16 respectively are located to be in a variable, opposed and overlapping position as the blades 14, 16 aare moved laterally so that a photocell aperture 42 and an exposure aperture 44 are formed as the aperture pairs 14a, 16a and 14b, 16b coincide (See FIG. 2). When the apparatus is in the position of FIG. 1, the aperture 42 may be some finite minimum size and the aperture 44 may be set to an aperture such that no light is passed along a photographic axis of the camera.

For the purpose of controlling the rate at which the aperture 44 is opened, a control member 46 is slidably mounted to the top lateral portion of the support plate 12. Brads 50, received in a slot 52 of the control member 46, permit the control member 46 to be moved from an initial to a final position under bias of a tension spring 48. The movement of the control member 46 is coupled to the blades 14, 16 by a flange 47 of the control member 46 which engages a post 49 carried by the flange 26. Thus it may be seen that the force of the spring 28 forces the blades 14 to follow movement of the control member 46 and, via the transmission lever 32, the blades 14, 16 move concurrently as the control member 46 moves. The rate of movement of the control member 46, and thus the time required to open the apertures 42, 44 may be regulated by an inertial flywheel 60 which includes a spur gear 64 coupled to a toothed edge 62 of control member 46. In the configuration shown, the motion of the control member 46 between its initial position and final position is inhibited by the inertial flywheel 60.

The movement of the blades 14, 16 is arrested by a pawl 70 which is positioned to engage the blade 14 at a serrated edge 76 thereof. The pawl 70 is integral with an armature 72, composed of magnetically attractable material, that represents a moving portion of an electromagnet 74. The electromagnet 74 is normally de-energized to permit a leg spring 78 to bias the armature 72 to position the pawl 70 out of engagement with the serrated edge 76. When the electromagnet 74 becomes energized, as shown in FIG. 2, the armature 72, being of magnetically attractable material, is biased in a direction to position the pawl 70 to engage the serrated edge 76, and upon engagement, the blades 14, 16 are arrested to form the aperture 42, 44.

To initiate and terminate passage of light through the aperture 44, the apparatus includes an apertured shutter blade 80 which is mounted to the vertical portion of the support plate 12 by the screws 18 and 20 which are received in slots 82 of the shutter blade 80. The screw-slot arrangement permits the shutter blade 80 to be slidably moved in the direction of arrow A, under the force of a spring 84, to position its aperture 86 in alignment with the aperture 44 and thus initiate an exposure. The shutter blade 80 is retained in the position of FIG. 1 by a latch 88 which engages a notch 90 of the shutter blade 80 when the latch 88 is biased in the counterclockwise direction by a leg spring 91, as shown in FIG. 1. To release the latch 88 and thus allow the shutter blade 80 to open, a cam surface 92, part of the latch 88, is located in the path of movement of a flange 94 carried by the control member 46. During movement of the control member 46, and at a preset position in its movement towards its final position, the flange 94 will engage the cam surface 92 to cause the latch 88 to be pivoted out of contact with the notch 90; the shutter blade 80 will thus be permitted to move in the direction of arrow A under the force of spring 84.

To arrest the shutter blade 80 at a position wherein the apertures 44, 86 are aligned, a spring-biased stop latch 96 is provided, being spring-biased in a clockwise direction by a leg spring 97 to position a detent 98 thereon relative to the path of movement of the shutter blade 80 so that a notch 99 of the shutter blade 80 will engage the detent 98 at a position of movement of the shutter blade 80 wherein the aperture 44, 86 are aligned.

To release the shutter blade 80 to permit its movement from the open position to the closed position, a shutter release member 102 is provided, being slidably mounted on the bottom lateral portion of the support plate 12 by means of brads 104 received in a slot 106 of the shutter release member 102. A tension spring 108, tensioned between a post 110 on the support plate 12 and a tab 112 of the shutter release member 102, urges the shutter release member 102 in the direction of arrow A. The movement of the shutter release member 102 is also inhibited by a toothed edge 114 which engages a spur gear 116 of an inertial flywheel 118. The shutter release member 102 is releasably retained in its cocked position by a latch lever 120, part of and therefore movable by the armature 72, which engages the shutter release member 102 at a flange 122 thereon. The shutter release member 102 is releasable to move in the direction of arrow A when the armature 72 moves to position the pawl 70 to engage the serrated edge 76, at which time the apertures 42, 44 are set.

Figure 3:
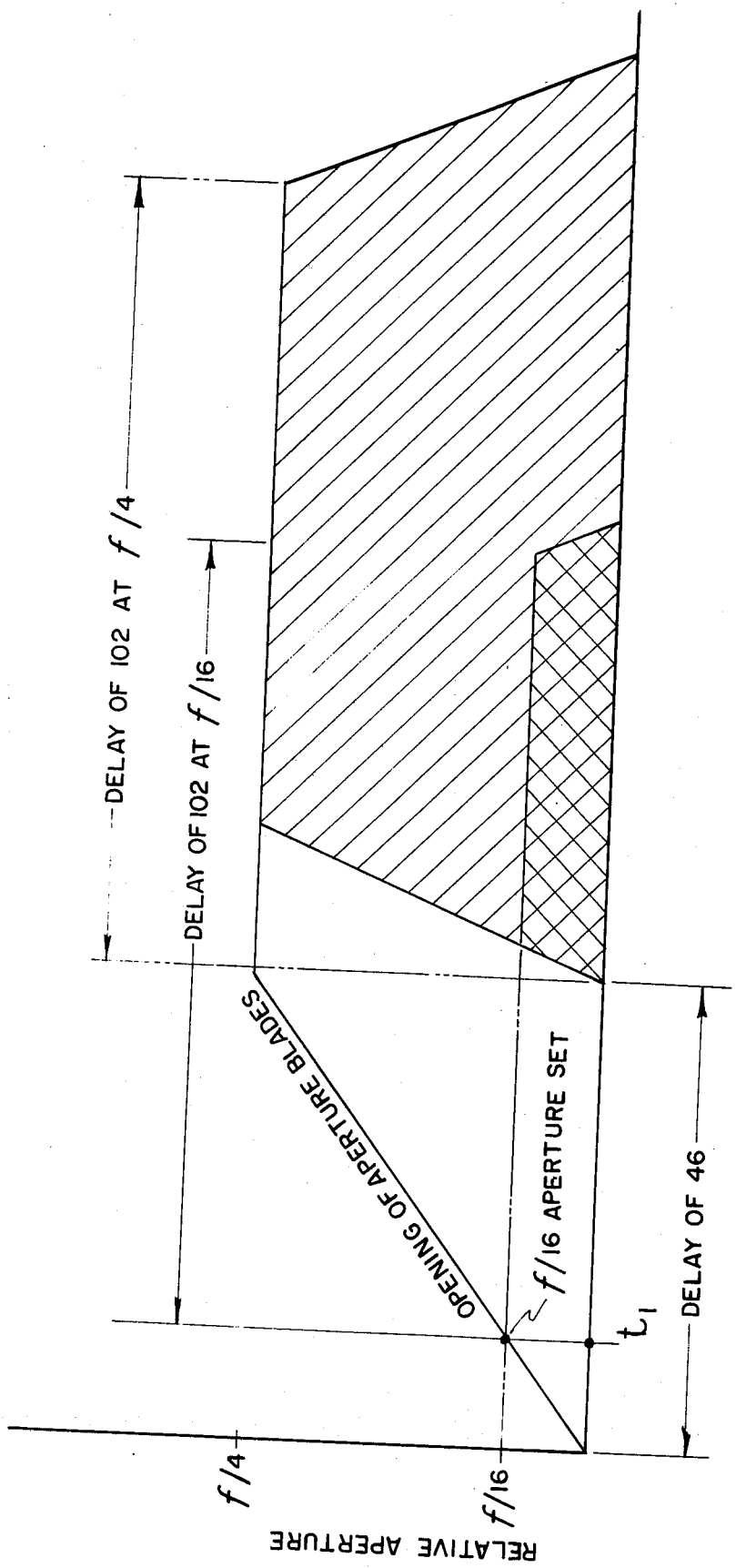
FIG. 3 is a timing chart showing the relationship between the opening and closing of shutter apparatus and the adjustment of the diaphragm to various exposure aperture sizes.

The control member 46 and shutter release member 102 are interconnected to be released for movement in a predetermined relationship to another, which is also related to the opening of the diaphragm blades 14, 16 and to the movement of the shutter blade 80. The relationship is shown in FIG. 3, a diagram which graphically relates the exposure interval to the time required to open the aperture 44 to a size related to received light intensity. It is to be noted by reference to FIG. 3 and the previous discussion that the flange 94 will also engage the cam surface 92 at a preset position in its movement towards its final position a preset position in its movement towards its final position and the shutter release member 102 will be released, to move to terminate the exposure, at some time in relation to the setting of the exposure aperture 44, which release may be at any point in time prior to or upon reaching of the maximum aperture 44. The flange 94 will engage the cam surface 92, to permit the shutter blade 80 to open at the point in time which is graphically shown as the end of the time termed "delay of 46" on the diagram of FIG. 3. The shutter release member 102 may be released, depending upon light intensity, at any point in time between the beginning and the end of delay of 46 of the diagram of FIG. 3. The operation of this element will be more fully described later.

The exposure apparatus 10 is adapted to be utilized with a light responsive electronic circuit (schematically shown in FIG. 1 only) of the type well known in the art and of the general form which includes a voltage or current-sensitive threshold circuit to control the energization of the electromagnet 74. Characteristically, the electronic circuit utilizes a photosensitive element (not shown), such as the well known cadmium sulfide or silicon photocell, which may be located behind the aperture 42 and receive light therethrough. The photosensitive element is normally coupled in series circuit with a resistance, the junction of which may be coupled to the input of the threshold circuit, so that when the relationship of the resistance of the photosensitive element and the series resistance reaches a predetermined relationship, the voltage of the junction therebetween is equal to the value of the threshold voltage which trips the threshold circuit to permit the electromagnet 74 to become energized. Such a circuit is disclosed in commonly assigned U.S. Pat. No. 3,672,267. The point at which the resistance of the photosensitive element reaches the required value to establish the threshold voltage is dependent upon the intensity level of the light received through the aperture 42, and as may be seen by the size of the aperture 42 of FIG. 2, may be reached at some point during the movement of the diaphragm blades to form an increasingly larger aperture 44. Having described the details of the preferred embodiment, the operation of the apparatus will firstly be described in relation to affecting an exposure at light intensity of level which would result in the apparatus setting an aperture, using the common $f/no$ notation, which corresponds to $f/16$. Secondly, the operation of the apparatus will be described in relation to affecting an exposure at a light intensity in which an aperture size corresponding to $f/4$, the maximum aperture size of the apparatus, is set.

Upon depressing a camera release 130, a tab 132 thereon is released from engagement with a detent 134 of the control member 46 and the control member 46 moves in the direction of arrow A under the force of tension spring 48. The flange 47, being in contact with the post 49 of flange 26, permits the blade 14 to follow the movement of the control member 46. The transmission lever 32, which couples the movement of the blade 16 to the movement of the blade 14, pivots about the screw 20 and the apertures 42, 44 begin to enlarge. When an aperture 44 of size which corresponds to $f/16$ is reached, the electromagnet 74 becomes energized by operation of an electronic circuit previously described. Upon energization of the electromagnets 74 the armature 72 becomes attracted thereto and the pawl 70 engages the serrated edge 76 to arrest the diaphragm blades 14, 16 at an aperture setting which corresponds to $f/16$.

Simultaneously with the movement of the armature 72 to position the pawl 70 to engage the serrated edge 76, the latch lever 120 becomes disengaged from the flange 122 of the shutter release member 102. Thus it may be seen by reference to FIG. 3 in conjunction with the previous discussion that, at a time $t_1$ as shown in FIG. 3, at which time the aperture 44 is set, the shutter release member 102 begins to move to terminate the exposure. It should be noted that when an aperture of size less than maximum is set, the shutter release member 102 is set in motion to terminate the exposure even though the control member 46 has not yet released the shutter blade 80 to open the aperture 44.

The control member 46 continues in motion and at a time as shown in FIG. 3 which corresponds to the end of "Delay of 46," the flange 94 of the control member 46 engages the cam surface 92 of the latch 88 and the shutter blade 80 is released to move under the force of the spring 84. During movement of the shutter blade 80, the notch 99 engages the detent 98 and movement of the shutter blade 80 is arrested when the apertures 44, 86 are aligned. Exposure is thus initiated by this movement. After a time which is labeled "Delay of 102 at $f/16$" as shown in FIG. 3 has elapsed, a striker 124, part of the shutter release member 102, engages a receiver 126, part of the stop latch 96, and pivots the stop latch 96 out of engagement with the shutter blade 80 thus permitting movement thereof to a position in which an opaque portion of the shutter blade 80 covers the aperture 44.

The operation of the apparatus at light intensity in which an aperture size corresponding to $f/4$ would be set is similar to the operation as previously described for an $f/16$ aperture setting except that the time at which the shutter release member 102 is released is delayed to correspond approximately to the time in which the control member 46 engages the latch 88 to release the shutter blade 80. This may be seen in FIG. 3 wherein the time marked "Delay of 102 at $f/4$" begins approximately (although shown exactly) with the end of the time marked "Delay of 46." Thus it may be seen that as previously stated, the shutter release member 102 may be released, depending upon light intensity, at any point in time between the beginning and the end of "Delay of 46" of the diagram of FIG. 3.

Besides the described, preferably design of the device disclosed it is also possible to have an adjustable rundown time and/or adjustable control distances of the control member 46 and the shutter release member 102 so that the exposure time can be adapted to the aperture forming time in the range between the smallest aperture up to the largest aperture. More particularly, by adjusting the movement of the last named elements, the change in the number "stops" of aperture to the change in the number of stops of shutter speed may be varied, i.e. one stop change in aperture to, say for example, two stops change in shutter speed. While the exposure time and the aperture are associated according to a preselected program, the efficiency is uneffected and remains good even with the shortest exposure times, as the shutter blade 80 moves to open and close the aperture 44 as effectively as two shutter blades.

In the range before the largest aperture 44, the exposure time and the aperture are associated according to the program in which the shortest exposure time is achieved with the smallest aperture. As the aperture increases, the exposure time increases, and when the largest possible aperture has been reached the exposure time is extended to associate the longest exposure time with the largest aperture 44. Thus it is obvious that the smallest aperture for which an exposure may be correctly executed is always sought by this apparatus. That is, the aperture begins at its smallest setting and is gradually increased until a point is reached at which an exposure may be achieved for the light conditions. Such operation produces a better relationship between exposure time and depth of field than cameras which have a fixed aperture of size to accommodate exposures at low and high light conditions, or those apparatus which only adjust shutter speed after a maximum aperture size has been reached.

The invention has been described in detail with particular reference to preferred embodiments thereof, but it will be understood that variations and modifications can be effected within the spirit and scope of the invention.

I claim:

1. In a camera, exposure control apparatus comprising:
   diaphragm means constructed and mounted for movement for forming an exposure aperture of a size ranging between a minimum and a maximum size;
   shutter means, mounted for movement between open and closed positions, for controlling the passage of light through said exposure aperture;
   means for actuating said shutter means to move to said open position a preselected time after actuation of said diaphragm means;
   light responsive means for arresting movement of said diaphragm means at a position wherein an exposure aperture of size related to scene brightness is formed; and
   means, cooperative with said light responsive means and said shutter means, for actuating said shutter means to close said exposure aperture a preselected time after arrest of said diaphragm means.

2. In a camera, exposure control apparatus comprising:
   diaphragm means constructed and mounted for movement to form an exposure aperture of size between a minimum and a maximum size;
   means for urging said diaphragm means toward said maximum aperture size;
   shutter means mounted for movement from a closed to an open and to a closed position relative to said exposure aperture to permit or terminate the passage of light therethrough;
   means for moving said shutter means from a closed to an open position of said exposure aperture;
   stop means for engaging and releasably retaining said shutter means in said position to open said exposure aperture;
   latch means, coupled to said shutter means, for retaining said shutter means in a closed position relative to said exposure aperture prior to opening of said exposure aperture;
   first control means, movable from an initial to a final position, including 1) first means, coupled to said diaphragm means, for permitting said urging means to move said diaphragm means toward said maximum aperture size in a controlled relationship to movement of said first control means towards said final position, and 2) second means, located relative to said shutter latch means to engage said shutter latch means at a preselected position in the movement of said first control means, for releasing said shutter means to move to said open position of said exposure aperture;
   light responsive means for arresting movement of said diaphragm means in relation to light intensity in a range of aperture sizes below said maximum aperture size;
   second control means, movable between an initial position and a final position, for releasing said shutter blade stop means to permit said shutter blade to move from an open to a closed position of said exposure aperture; and
   means, coupled with said light responsive means, for retaining said second control means in said initial position and, being responsive to operation of said light responsive means to arrest said diaphragm means, for releasing said second control means to move towards said final position.

3. Exposure control apparatus as claimed in claim 2 wherein said light responsive means includes electromagnetic control means for arresting said diaphragm means, the electromagnetic control means including a movable armature which cooperates with the second control member for releasing the second control member when said electromagnetic control means is actuated to arrest said diaphragm means.

4. Exposure control apparatus as claimed in claim 2 including means for controlling the movement of said first and second control means between said initial and final rest position.

5. Exposure control apparatus as claimed in claim 4 wherein said means for controlling the movement of said first and second control means includes a retard mechanism.

* * * * *